United States Patent [19]

Kramer, Jr.

[11] Patent Number: 4,796,520

[45] Date of Patent: Jan. 10, 1989

[54] SYSTEM FOR EXHAUSTING FUMES FROM RESIDENTIAL GARAGES

[76] Inventor: Vance M. Kramer, Jr., 1913 Greendale Ave., Findlay, Ohio 45840

[21] Appl. No.: 125,883

[22] Filed: Nov. 27, 1987

[51] Int. Cl.⁴ .............................................. F23J 11/02
[52] U.S. Cl. ............................... 98/115.4; 98/DIG. 7; 104/52; 285/901; 285/903
[58] Field of Search ............... 138/103, 177, 178, 106, 138/107; 52/198; 98/42.01, 42.16, 49, 115.4, 118, DIG. 7; 104/52; 285/162, 208, 209, 901, 903

[56] References Cited

U.S. PATENT DOCUMENTS

| | | | |
|---|---|---|---|
| 1,679,705 | 8/1928 | Baumgartel | 104/52 |
| 2,023,263 | 12/1935 | Blume | 98/115.4 X |
| 2,598,884 | 6/1952 | Brady, Jr. | 104/52 |
| 4,050,363 | 9/1977 | Fuerst | 98/42.01 X |
| 4,102,254 | 7/1978 | Grant | 98/115.4 |
| 4,441,745 | 4/1984 | Nicholas | 285/903 X |
| 4,747,621 | 5/1988 | Gans et al. | 285/903 X |

Primary Examiner—Harold Joyce
Attorney, Agent, or Firm—Pearne, Gordon, McCoy & Granger

[57] ABSTRACT

A system for venting exhaust fumes from vehicle engines being operated in enclosed spaces, such as in residential garages. The system provides for conveying the gases from the vehicle exhaust pipe through an opening formed in the garage door or the like. The equipment includes a door port mounted in the garage door opening and which defines a passage with a cylindrical interior surface extending through the door. An exterior closure plate is pivotally mounted on the outside of the door port to swing between a closed vertical position covering the passage and an upward, horizontal, open position. The interior surface of the sleeve has an inwardly projecting radial rib that defines an arcuate portion of an internal helical thread. The exhaust fumes are conveyed from the exhaust pipe to the door passage by flexible tubing formed with helical corrugations that define an external helical thread. One end of the tubing has a cylindrical outer surface extending beyond the helical corrugations and adapted to slide through the door port passage to engage and lift the closure plate. When the tubing is then rotated about its axis, the external thread engages the internal helical portion to retain the tubing against axial movement that could cause disconnection.

4 Claims, 2 Drawing Sheets

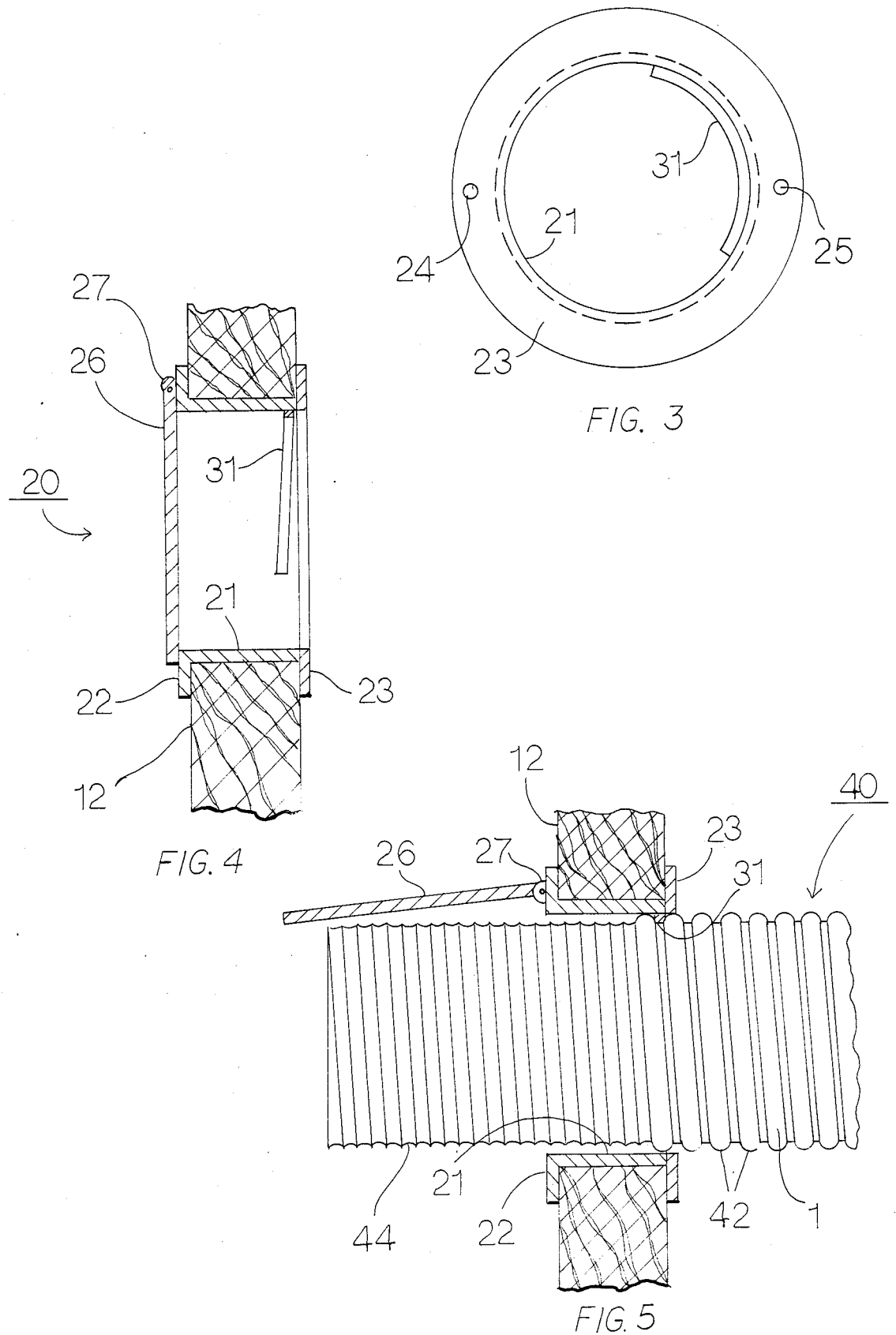

SYSTEM FOR EXHAUSTING FUMES FROM RESIDENTIAL GARAGES

BACKGROUND OF THE INVENTION

This invention relates to the exhausting of noxious fumes from enclosed spaces, and particularly for removing exhaust gases produced by automotive vehicle engines, from a garage or other enclosed space when the vehicle engine is operated for servicing purposes. More particularly, the invention relates to an assembly that may be installed in a residential garage to exhaust the combustion products through a small opening or port in the garage door.

Automobile owners and owners of small trucks frequently find it desirable to perform service and maintenance on their vehicles at their own homes and using their own facilities. During servicing and maintenance, it is occasionally necessary to run the vehicle engine for considerable periods of time. Because of the toxic nature of the combustion products that exit the tailpipe, it is necessary that engine operation be conducted either outdoors or in a garage with the garage door fully opened.

This is a serious problem in colder climates, particularly in the winter months. In some cases, it may be so uncomfortable to perform maintenance operations on the vehicle with the engine running that automobile owners may attempt to run the engine with the garage door closed. This presents serious dangers for reasons that will be readily apparent.

In most commercial garages where automotive service and maintenance are performed, some means is provided for exhausting the combustion products through a hose or the like from the enclosed working area. Some of these systems are quite elaborate, and use large blowers, etc. None of these systems, however, are suitable for residential use due to the complexity and cumbersome nature of the equipment.

The system of the present invention, however, resolves the difficulties indicated above and affords other features and advantages heretofore not obtainable.

SUMMARY OF THE INVENTION

The present invention provides a system for venting to outside atmosphere exhaust fumes from the exhaust pipe of an automotive vehicle located in a residential garage or the like wherein there is a garage door or other type of outside wall. The system requires a circular port or aperture formed in the garage door or outside wall.

A tubular sleeve member or door part is mounted in the aperture, to provide a cylindrical interior surface defining a passage therethrough. The door part includes an exterior closure plate that pivots about a horizontal hinge axis located above the passage, between a closed position covering the passage and an upwardly-pivoted open position. The interior surface of the sleeve has an inwardly projecting radial rib defining a portion of an internal helical thread.

Cooperating with the door port is a flexible hose having a helically corrugated main length portion that defines an external helical thread. The inner end of the hose is attachable to the exhaust pipe of the automotive vehicle, and the outer end is connectable to the door port. The outer end has a cylindrical outer surface adapted to be inserted entirely through the passage to engage and lift the closure plate by pivoting it about its horizontal axis. It also extends through the passage sufficiently to hold the plate open.

Also, the outer end is inserted through the passage until the respective end of the helical thread abuts the inwardly projecting radial rib. When this occurs, the hose is rotated to thread the external helical thread of the main length portion onto the inwardly projecting radial rib. In this way, the main body of the hose is partially threaded into the door port to retain the hose against axial movement that could cause disconnection of the hose from the sleeve.

BRIEF DESCRIPTION OF THE DRAWINGS

FIG. 3 is an elevational view, showing the door port of the invention as viewed from the inside;

FIG. 4 is a fragmentary, sectional view on an enlarged scale, illustrating the door port mounted in an opening in a typical garage door; and FIG. 5 is a fragmentary, sectional view showing the door port of FIGS. 2, 3, and 4, with a hose end coupled thereto in accordance with the invention.

DESCRIPTION OF THE PREFERRED EMBODIMENT

Figure 1:
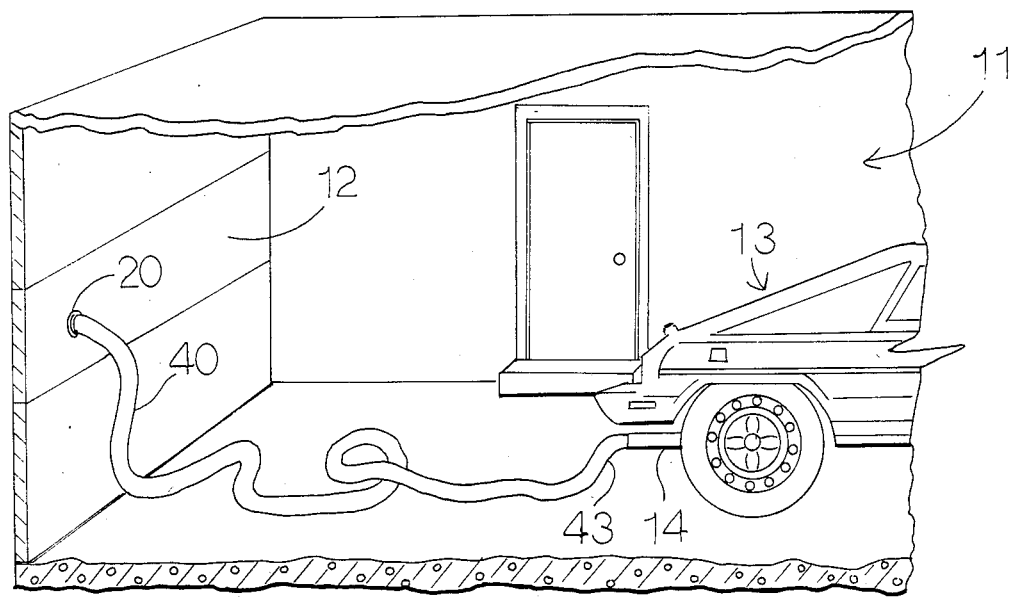
FIG. 1 is a fragmentary, perspective view of a portion of the interior space of a residential garage having an exhaust gas removal system embodying the invention located therein, and having parts broken away for the purpose of illustration.

Referring more particularly to the drawings, and initially to FIG. 1, there is shown a portion of a typical residential garage 11 having an overhead garage door 12 composed of three articulated segments and a passenger vehicle 13 located within the garage. The vehicle 13 has an exhaust pipe 14 which, when the vehicle engine is operated, emits noxious and poisonous combustion products that would present a serious danger if the garage door were closed during its operation.

In accordance with the invention, there is provided a system for exhausting the combustion products from the tailpipe 14 to outside atmosphere. The system includes a door port 20 adapted to be mounted in an opening in one segment of the garage door 12 and a flexible, tubular, corrugated, elastomeric hose 40 adapted to be connected between the end of the exhaust pipe 14 and the door port 20. The door port 20 is adapted to be mounted in a circular opening that is bored through the garage door.

The door port 20 includes a cylindrical sleeve 21, with a radial flange 22 on the outside thereof. A separate radial inner flange 23 is adapted to be placed against the inner surface of the garage door concentric with the opening bored through the door and in position to be secured to the cylindrical sleeve 21 and radial flange 22 by machine screws 24 and 25. The screws 24 and 25 extend through small openings in the radial outer flange 22, through corresponding holes drilled through the garage door, and into threaded holes in the inner flange 23. Tightening the screws serves to clamp the door port tightly in place.

Figure 2:
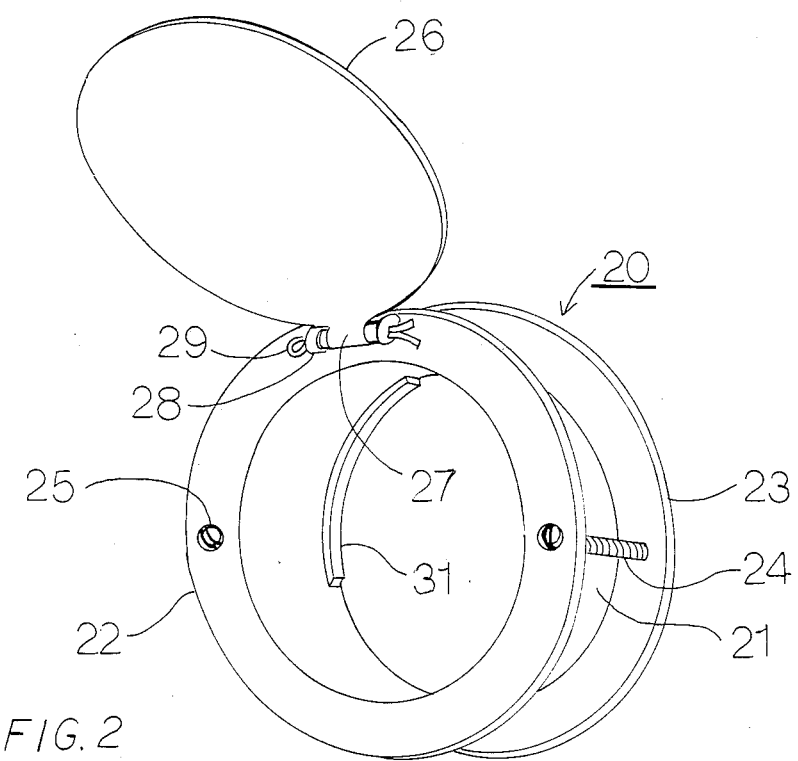
FIG. 2 is a perspective view of a door port forming a part of the present invention, and showing the closure plate pivoted to an open position.

Mounted on the radial outer flange is a circular closure plate 26. The plate 26 has a hinge knuckle 27 at the top portion that is secured to a hinge knuckle 28 on the flange 22 by a cotter pin 29. Accordingly, the circular closure plate is pivotable between a closed position, best shown in FIG. 4, and an open position shown in FIGS. 2 and 5.

The cylindrical sleeve 21 defines a passage with a cylindrical inner surface 30 that extends entirely through the garage door. The surface 30 has an inwardly extending radial projection 31 located adjacent its inner edge, and which extends circumferentially through about 90 degrees of arc. The projection has a helical configuration so as to define a portion of an internal helical thread.

The flexible corrugated hose 40 that extends between the exhaust pipe 14 and the door port 20 has a main body 41 with helical corrugations in the manner shown in U.S. Pat. Nos. 2,832,096; 2,888,712; 2,909,198; and 3,155,757, and which may be made according to the processes described in those patents. The hose also has an inner end 43 adapted to fit over the automobile exhaust pipe 14 and an outer end length 44 with an outer diameter such that the end 44 can be slid axially through the passage defined by the door port 20, past the outer flange 22 in the manner shown in FIG. 5 to engage and pivot the closure plate 26 upwardly to an open position and retain it there. Retention is rendered more positive by means of cooperation between the radial projection 31 and the helical corrugations 42 on the main body of the hose.

When the end length 44 has been extended sufficiently through the door port, the initial convolution of the helical corrugations engages the projection 31. Then the hose is rotated to achieve a threaded engagement between the helical corrugations and the projection, and thus positively lock the hose 40 against axial movement relative to the port that could otherwise permit accidental disconnection of the hose and closing of the closure plate as well. With this arrangement, a positive coupling of flexible hose 40 to the door port 20 is achieved, and the dangers of disconnection are substantially avoided.

While the invention has been shown and described with respect to a specific embodiment thereof, this is intended for the purpose of illustration rather than limitation, and other variations and modifications of the specific system herein shown and described will be apparent to those skilled in the art all within the spirit and scope of the invention. Accordingly, the patent is not to be limited in scope and effect to the specific embodiment herein shown and described, or in any other way that is inconsistent with the extent to which the progress in the art has been advanced by the invention.

What is claimed is:

1. An apparatus for venting to outside atmosphere exhaust fumes from the exhaust pipe of an automotive vehicle located in an enclosed space with at least one outside wall portion, comprising:

means defining an aperture in the outside wall portion;

a tubular sleeve member mounted in said aperture and having a cylindrical interior surface defining a passage therethrough, said sleeve member including an exterior closure plate connected thereto for pivotal movement about a horizontal hinge axis located above the passage, between a closed position suspended over and closing the passage and an upwardly-pivoted open position, the interior surface of said sleeve having an inwardly projecting radial rib defining an arcuate portion of an internal helical thread; and a flexible hose having a helically corrugated main length portion that defines an external helical thread, an inner end portion attachable to the exhaust pipe and an outer end portion connectable to the tubular sleeve member, said outer end portion having a cylindrical outer surface adapted to be inserted through said passage to engage and raise said closure plate and to extend therethrough sufficiently that said main length portion threadedly engages said rib when axially rotated relative thereto.

2. An apparatus as defined in claim 1, wherein said radial rib defines about 90 degrees of arc.

3. An apparatus as defined in claim 1, wherein said sleeve member has an external radial flange adapted to engage the exterior surface of said outside wall portion.

4. An apparatus as defined in claim 3, further including an annular interior flange adapted to be secured to the exterior flange and to bear against the interior surface of the outside wall portion to clamp said sleeve member to the wall portion.

* * * * *